United States Patent [19]

Fujita et al.

[11] Patent Number: 5,423,634
[45] Date of Patent: Jun. 13, 1995

[54] HYDRAULIC COMPOSITION AND PROCESS FOR PRODUCING CONCRETE PILE USING THE SAME

[75] Inventors: Kotaro Fujita, Chiba; Kazuto Yoshimori, Tokyo; Tomoyuki Sugaya, Chiba; Yukinori Yamazaki, Chiba; Takashi Suzuki, Chiba; Satoshi Tanaka; Takahisa Okamoto, both of Tokyo, all of Japan

[73] Assignee: Nihok Cement Company, Ltd., Tokyo, Japan

[21] Appl. No.: 34,863

[22] Filed: Mar. 19, 1993

[51] Int. Cl.$^6$ ............................ C04B 7/02; E03D 7/00
[52] U.S. Cl. .................................... 405/256; 106/707; 264/256; 405/231; 405/232
[58] Field of Search .............. 405/128, 263, 256, 257, 405/231, 232; 106/708, 900, 707; 264/256, DIG. 29

[56] References Cited

U.S. PATENT DOCUMENTS

| | | |
|---|---|---|
| 3,767,433 | 10/1973 | Haldas et al. . |
| 4,187,118 | 2/1980 | Nakagawa et al. ................ 106/708 |
| 4,230,499 | 10/1980 | Nakagawa et al. ................ 106/708 |
| 4,353,746 | 10/1982 | Birchall et al. . |
| 4,538,042 | 8/1985 | Tanaka et al. ........................ 219/58 |
| 4,864,797 | 9/1989 | Sato et al. ............................ 264/256 |
| 4,915,741 | 4/1990 | Biagini et al. . |
| 5,236,501 | 8/1993 | Nomachi et al. . |

FOREIGN PATENT DOCUMENTS

| | | |
|---|---|---|
| 1020597 | 11/1977 | Canada . |
| 1190947 | 7/1985 | Canada . |
| 60-59182 | 12/1985 | Japan . |
| 62-162506 | 7/1987 | Japan . |
| 1-242445 | 9/1989 | Japan . |
| 2-31020 | 7/1990 | Japan . |
| 2-208252 | 8/1990 | Japan . |
| 4-31349 | 2/1992 | Japan . |

OTHER PUBLICATIONS

English Translation of Office Action on Corresponding German Application.
Zement Kalk Gips [Cement Line Gypsum] (38) No. 4/1985, pp. 169–178 with English Translation ZKG 4/85 (pp. 169–178) Particle Size Distribution and Properties of Cement Part 1: Strength of Portland Cement.
Zement Kalk Gips (26) No. 8/1973, pp. 349–355.

*Primary Examiner*—Dennis L. Taylor
*Attorney, Agent, or Firm*—Sughrue, Mion, Zinn, Macpeak & Seas

[57] ABSTRACT

A hydraulic composition comprising (a) a cement composition prepared by subjecting size-adjusted cement having its particle size distribution adjusted to have a 50% pass particle diameter of from 2 to 7 μm and a ratio of a 90% pass particle diameter to a 10% pass particle diameter of from 25 to 40 to a water-spraying treatment to increase the loss on ignition thereof by 0.5 to 2.0% by weight and (b) a water reducing agent; and a process for producing a concrete pile by using a mixture of the hydraulic composition and from 18 to 25% by weight of water based on the hydraulic composition. A mortar or concrete mixture of the hydraulic composition exhibits sufficient fluidity and provides a hardened product having a greatly improved compressive strength. The concrete pile produced by using the hydraulic composition has a compressive strength of 800 kgf/cm$^2$ or higher at one day age.

10 Claims, No Drawings

HYDRAULIC COMPOSITION AND PROCESS FOR PRODUCING CONCRETE PILE USING THE SAME

FIELD OF THE INVENTION

This invention relates to a novel hydraulic composition which manifests high strength on hardening and a process for producing concrete piles using the same. More particularly, it relates to a novel hydraulic composition comprising a cement composition with its particle size distribution and loss on ignition being adjusted and a water reducing agent, and to a process for producing high strength concrete piles using the hydraulic composition.

BACKGROUND OF THE INVENTION

Improvement in strength of hardened cement is an ever-continuing subject of study. The ultimate aim of the study is reduction in production cost.

The subject has been approached from the angles of (1) material and (2) working method. The subject from the angle of material (1) is further divided into (a) improvement in chemical and physical characteristics of cement and (b) utility of additives, and much study has been given to a combination thereof as well. As examples of (a), improved cement obtained by finely grinding ordinary cement to a specific surface area by the Blaine method of 8,000 cm$^2$/g or more (as described in JP-A-2-208252, the term "JP-A" as used herein means an "unexamined published Japanese patent application"), hydraulic cement mainly composed of three groups of particles each having a particle diameter of not more than 10 μm, a particle diameter of from 20 to 45 μm and a particle diameter of from 63 to 150 μm (as described in JP-A-1-242445) and an analogous technique (as described in JP-B-2-31020 and U.S. Pat. No. 4,353,746, the term "JP-B" as used herein means an "examined published Japanese patent application") have been proposed. As examples of (b), a combination of a water reducing agent and silica fume (as described in JP-B-60-59182 and Canadian Patent 1,190,947) has been proposed.

JP-A-62-162506 and U.S. Pat. No. 4,915,741 propose a composition of water-added cement which is prepared by adding 0.1 to 10% by weight of water to ordinary cement and mixing the resulting water-added cement with a water reducing agent. According to the disclosure, the composition of water-added cement exhibits satisfactory fluidity, a satisfactory water reducing effect and improved strength.

However, even with the cement proposed to date and with careful working, the improvement attained in strength is not higher than about 10 to 15% over the strength obtained with commercially available cement, and no further improvement can be expected.

SUMMARY OF THE INVENTION

In the light of these circumstances, the present inventors have conducted an extensive investigation in pursuit of further improved strength from the aspect of material. As a result, they have developed a hydraulic composition which can be prepared with relative ease and unexpectedly provides markedly improved strength over the conventional techniques. They have also found that the hydraulic composition is sufficiently applicable to production of concrete piles which are required to have the highest strength of all the concrete products. The present invention has been completed based on these knowledge.

Accordingly, an object of the present invention is to provide a novel hydraulic composition which provides a high compressive strength, i.e., 700 kgf/cm$^2$ or higher at one day age as hardened mortar.

Another object of the present invention is to provide a process for producing a concrete pile using the hydraulic composition, by which a concrete pile having a compressive strength of 800 kgf/cm$^2$ or higher at one day age can be obtained simply by curing a molding of a concrete mixture in moist air (moist curing) without heat.

Other objects and effects of the present invention will be apparent from the following description.

The present invention provides a hydraulic composition comprising (a) a cement composition prepared by subjecting cement having its particle size distribution adjusted to have a 50% pass particle diameter of from 2 to 7 μm and a ratio of a 90% pass particle diameter to a 10% pass particle diameter of from 25 to 40 to a water-spraying treatment to increase the loss on ignition thereof by 0.5 to 2.0% by weight and (b) a water reducing agent.

The present invention also provides a process for producing a high strength concrete pile using a mixture of the above-mentioned hydraulic composition and a specific amount of water, that is, a process for producing a high strength concrete pile comprising centrifugal molding and curing of a concrete raw material mixture, the concrete raw material mixture comprising (A) a hydraulic composition, as a cement, comprising (a) a cement composition prepared by subjecting cement having its particle size distribution adjusted to have a 50% pass particle diameter of from 2 to 7 μm and a ratio of a 90% pass particle diameter to a 10% pass particle diameter of from 25 to 40 to a water-spraying treatment to increase the loss on ignition thereof by 0.5 to 2.0% by weight and (b) a water reducing agent, and (B) from 18 to 25% by weight of water based on said hydraulic composition (the mixing ratio of water to the hydraulic composition will hereinafter be referred to as "water/hydraulic composition").

DETAILED DESCRIPTION OF THE INVENTION

The terminology "50% pass particle diameter" (hereinafter simply referred to as "50% diameter") means a particle size corresponding to a sieve opening through which 50% by weight of powder passes. Similarly, the terminology "90% pass particle diameter" (hereinafter simply referred to as "90% diameter") or "10% pass particle diameter" (hereinafter simply referred to as "10% diameter") means a particle size corresponding to a sieve opening through which 90% or 10% by weight of powder passes. A ratio of 90% diameter to 10% diameter will hereinafter be simply referred to as a "diameter ratio".

The cement with its particle size distribution being adjusted (hereinafter simply referred to as "size-adjusted cement") which can be used in the present invention is obtained from commercially available Portland cement, such as ordinary, high-early-strength or ultrahigh-early-strength Portland cement, and preferably high-early-strength Portland cement, by adjusting its particle size distribution so as to have a 50% diameter of from 2 to 7 μm and a diameter ratio of from 25 to 40.

Commercially available high-early-strength Portland cement usually has a 50% diameter of from 8 to 10 μm and a diameter ratio of from 20 to 23. The means for size adjustment of Portland cement, e.g., high-early-strength Portland cement, is not particularly restricted. For example, size adjustment can be carried out by an appropriate combination of commonly employed methods, such as grinding, classification, and mixing.

If the size-adjusted cement is too fine as having a 50% diameter of less than 2 μm, a mortar or concrete mixture prepared by using the resulting hydraulic composition has poor fluidity. This being the case, the quantity of water to be mixed with the hydraulic composition (hereinafter referred to as "mixing water") or the quantity of water for the water-spraying treatment hereinafter described must be so increased to improve the fluidity, ultimately resulting in a reduction in strength of a hardened product. On the other hand, if the 50% diameter exceeds 7 μm, the strength obtained would also be reduced. Accordingly, the size-adjusted cement should have a 50% diameter ranging from 2 to 7 μm, and preferably from 2 to 5 μm.

If the diameter ratio of the size-adjusted cement is less than 25, such cement contains a large proportion of intermediate particles only to provide a mortar or concrete mixture having poor fluidity. Such being the case, the fluidity cannot be improved simply by increasing the amount of water spray but by also increasing the amount of mixing water, ultimately leading to a serious reduction in strength of a hardened product. If the diameter ratio exceeds 40, on the other hand, such cement contains a large proportion of fine particles. It follows that the fluidity of the mortar or concrete mixture containing the resulting hydraulic composition is deteriorated. The amount of mixing water or the amount of water spray must be increased for compensation for the poor fluidity, which not only causes a reduction in strength of a hardened product but also increases the cost for size adjustment. Accordingly, the diameter ratio of the size-adjusted cement should fall within a range of from 25 to 40, and preferably from 30 to 40.

The size-adjusted cement which can be used in the present invention generally has a specific surface area of about 6,000 cm$^2$/g or more.

In the present invention, it is required that the cement be adjusted to have the above-specified 50% diameter and diameter ratio before being subjected to a water-spraying treatment.

The cement composition used in the present invention is prepared by uniformly spraying water on the abovementioned size-adjusted cement to produce a trace amount of hydrates. Tap water may be used for the water-spraying treatment. It is of great importance to increase a loss on ignition by the water-spraying treatment. The "loss on ignition" as referred to herein is a weight loss (%) of a specimen when ignited at 950°±50° C. until a constant weight is reached as specified in JIS R5202 "Method for Chemical Analysis of Portland Cement".

The loss on ignition of the size-adjusted cement before a water-spraying treatment is generally in the range of from about 0.8 to 1.5% by weight. It is necessary in the present invention to increase the loss on ignition of the size-adjusted cement by 0.5 to 2.0% by weight by the water-spraying treatment.

If the increase in loss on ignition is less than 0.5% by weight, the mixture has poor fluidity, and the strength attained is low. If it exceeds 2.0% by weight, the strength attained is also low. A preferred increase in loss on ignition is from 0.8 to 1.8% by weight.

Although a loss on ignition may be increased by addition of an organic substance, limestone, etc., such is not effective in the present invention.

A water-spraying treatment of the size-adjusted cement should be conducted as uniformly as possible. The means for the water-spraying treatment is not particularly limited, and the treatment may be appropriately carried out by any of commonly employed methods, such as a combination of a double axle kneader and an ultrasonic humidifier, and a pin mixer for powder humidifying.

The water reducing agent which can be used in the present invention is not particularly limited. Examples thereof include D-naphthalene sulfonate-formalin condensation products, melamine sulfonate-formalin condensation products, polycarboxylic acid compounds, and aromatic polyaminosulfonated compounds. Among these, β-naphthalene sulfonate-formalin condensation products is preferably used in the present invention.

The amount of the water reducing agent to be compounded is not particularly critical but preferably ranges from 0.5 to 2.0% by weight (on a solid basis) based on the cement composition.

The hydraulic composition of the present invention is obtained by thoroughly mixing the water reducing agent and the above-mentioned cement composition. In one embodiment of the present invention, a water reducing agent is added to the cement composition obtained by subjecting the size-adjusted cement to a water-spraying treatment to form a trace amount of hydrates. The mixing may be carried out by any of commonly employed means.

In another embodiment which is also included in the scope of the present invention, the cement composition of the present invention is mixed with a water reducing agent together with other mortar or concrete raw materials as is common in the preparation of a mortar or concrete mixture. What is essential in the present invention is that a final mortar or concrete mixture contains the cement composition and the water reducing agent in the form of a hydraulic composition as specified in the present invention. The water reducing agent may be used as dissolved in water which is mixed as one of mortar or concrete raw materials. However, if the water reducing agent is previously dissolved in water for water spraying and then sprayed onto the size-adjusted cement, the resulting hydraulic composition has poor fluidity, the water reducing effect is small, and the strength attained is low.

Therefore, it is very important in the present invention that the hydraulic composition be a mixture of a water reducing agent and the cement composition having been subjected to a water-spraying treatment. If any of the above-mentioned requirements is not fulfilled, a desired compressive strength of at least 700 kgf/cm$^2$ of hardened mortar at one day age cannot be obtained as demonstrated in Table 1 hereinafter described.

The process for producing a concrete pile by using the above-mentioned hydraulic composition will be explained below.

The process comprises centrifugal molding and curing of a concrete raw material mixture, in which the concrete raw material mixture contains, as cement, the hydraulic composition and from 18 to 25% by weight of water based on the hydraulic composition.

While according to JIS A5337 "Pretensioned Span High Strength Concrete Piles", a compressive strength of concrete obtained by centrifugal compaction is specified to be at least 800 kgf/cm$^2$ upon use, "a compressive strength at one day age" is used as a criterion in the present invention.

Concrete piles satisfying the requirement as specified in JIS A5337 have conventionally been produced by subjecting centrifugal moldings of a concrete mixture to steam curing or autoclave curing (hereinafter inclusively referred to as "heating curing") followed by air curing for several days. In these processes, special facilities for curing and space therefor meeting the production scale are needed.

According to the process of the present invention, to the contrary, neither special facilities nor space for curing is required. That is, a concrete mixture prepared by adding a specific amount of water to the hydraulic composition is molded under general conditions for centrifugal compaction and then cured under ordinary moist curing conditions (hereinafter referred to as "moist curing") for only 1 day to produce a concrete pile having a compressive strength as high as 800 kgf/cm$^2$ or more.

Thus, the pronounced feature of the process of the present invention consists in that concrete piles with desired high strength can be produced in a short period of time without involving heating curing as conventionally required. In the present invention, the curing time may further be reduced by conducting steam curing or autoclave curing in place of or in addition to the moist curing.

The amount of mixing water to be mixed with the hydraulic composition is from 18 to 25% by weight based on the amount of the hydraulic composition.

If the amount of mixing water is less than 18% by weight, mixing up of concrete raw materials would be insufficient, the resulting mixture has poor fluidity, and centrifugal compaction does not sufficiently work. If it exceeds 25% by weight, the compressive strength at 1 day age is drastically reduced.

The present invention is now illustrated in greater detail with reference to Examples in view of Comparative Examples, but it should be understood that the present invention is not deemed to be limited thereto. All the percents and ratios are given by weight unless otherwise indicated.

EXAMPLES 1 TO 9

(1) Preparation of Cement Composition

Commercially available high-early-strength Portland cement ("Velo Cement" produced by Nihon Cement Co., Ltd.; loss on ignition: 1.1%; specific surface area: 4,350 cm$^2$/g) was ground in a test mill to obtain several kinds of finely ground cement having a specific surface area varying from 4,500 to 17,000 cm$^2$/g.

The resulting cement grinds of different particle diameter were appropriately mixed to prepare size-adjusted cement having the 50% diameter and diameter ratio shown in Table 1 below. The loss on ignition of the resulting size-adjusted cement was between 1.1% and 1.2%.

The size-adjusted cement was charged in a double axle kneader, sprayed with water while stirring by means of an ultrasonic humidifier, and allowed to stand for 12 hours to cause hydration to obtain a cement composition having an increased loss on ignition. The percent increase of loss on ignition is shown in Table 1.

The 50% diameter and diameter ratio were measured by laser diffractiometry and a scattering particle size analyzer (a product of Seishin Kigyo Co., Ltd.), and the loss on ignition was measured in accordance with JIS R5202.

(2) Preparation of Hydraulic Composition

A β-naphthalene sulfonate-formalin condensation product ("Mighty 100" produced by Kao Corp.) was added to each of the resulting cement compositions as a water reducing agent at a compounding ratio shown in Table 1, and the mixture was thoroughly mixed in a usual manner to prepare a hydraulic composition.

(3) Preparation of Hardened Mortar and Strength Measurement

The hydraulic composition was mixed with emery sand ("Emery" produced by Kiura Emery Co., Ltd.; particle size distribution: 2.5 to 1.5 mm/1.2 to 0.3 mm/<0.3 mm=2/3/1) as fine aggregate at a ratio of 1/3, and mixing water was added thereto in such an amount that the resulting mixture might have a flow value of 190 (mm) as measured in accordance with JIS R5201 "Physical Testing Methods of Cement". The mixing was conducted by means of a Hobart mixer.

The resulting mortar mixture was molded in a mold of 4×4×16 cm, subjected to moist curing at 20° C. for 24 hours, and removed from the mold to obtain hardened mortar specimens for measurements of compressive strength at varying ages.

One of the specimens was immediately subjected to measurement of compressive strength at one day age, while another specimen was cured in water at 20° C. to 28 days age and then subjected to measurement of compressive strength. The results obtained are shown in Table 1.

COMPARATIVE EXAMPLES 1 TO 8

Comparative cement compositions shown in Table 1 were prepared in the same manner as in Example 1-(1). The size-adjusted cement had a loss on ignition between 1.1 and 1.2%.

Each cement composition was mixed with a water reducing agent in the same manner as in Example 1-(2) to prepare a hydraulic composition.

A mortar mixture and hardened mortar specimens were prepared by using the resulting hydraulic composition in the same manner as in Example 1-(3). The compressive strength of the specimens is shown in Table 1.

The mortar of Comparative Example 8 was prepared by mixing the commercially available high-early-strength Portland cement as used above with the water reducing agent.

TABLE 1

| Example No. | 50% Diameter (μm) | Diameter Ratio | Loss on Ignition Increase (%) | Amount of Water Reducing Agent (%) | Water/Hydraulic Composition (%) | Compressive Strength (kgf/cm$^2$) | |
| --- | --- | --- | --- | --- | --- | --- | --- |
| | | | | | | 1 Day | 28 Days |
| Example 1 | 2.3 | 33.5 | 1.5 | 1.6 | 21.0 | 800 | 1,240 |

TABLE 1-continued

| Example No. | 50% Diameter (μm) | Diameter Ratio | Loss on Ignition Increase (%) | Amount of Water Reducing Agent (%) | Water/Hydraulic Composition (%) | Compressive Strength (kgf/cm$^2$) 1 Day | Compressive Strength (kgf/cm$^2$) 28 Days |
| --- | --- | --- | --- | --- | --- | --- | --- |
| Example 2 | 3.3 | 35.1 | 1.5 | 1.6 | 22.0 | 770 | 1,230 |
| Example 3 | 4.0 | 28.2 | 1.5 | 1.6 | 24.0 | 730 | 1,120 |
| Example 4 | 4.2 | 38.4 | 0.7 | 1.6 | 23.1 | 750 | 1,200 |
| Example 5 | 4.2 | 38.4 | 1.2 | 1.6 | 19.9 | 830 | 1,270 |
| Example 6 | 4.2 | 38.4 | 1.8 | 1.6 | 20.3 | 820 | 1,250 |
| Example 7 | 4.6 | 25.2 | 1.5 | 1.6 | 24.9 | 710 | 1,140 |
| Example 8 | 5.0 | 32.5 | 1.2 | 1.6 | 22.7 | 780 | 1,210 |
| Example 9 | 6.8 | 28.1 | 1.5 | 1.6 | 24.8 | 700 | 1,120 |
| Comparative Example 1 | 1.7 | 30.2 | 1.5 | 1.6 | 29.7 | 550 | 970 |
| Comparative Example 2 | 3.8 | 41.5 | 1.6 | 1.6 | 26.4 | 540 | 990 |
| Comparative Example 3 | 4.2 | 38.4 | 0.3 | 1.6 | 35.3 | 430 | 920 |
| Comparative Example 4 | 4.2 | 38.4 | 2.5 | 1.6 | 22.5 | 490 | 890 |
| Comparative Example 5 | 5.2 | 24.0 | 1.5 | 1.6 | 27.5 | 570 | 990 |
| Comparative Example 6 | 8.1 | 25.4 | 1.5 | 1.6 | 28.2 | 530 | 910 |
| Comparative Example 7 | 4.2 | 38.4 | 1.8 | 0 | 45.0 | 250 | 680 |
| Comparative Example 8 | 9.0 | 22.5 | 0 | 1.6 | 35.0 | 380 | 750 |

It is understood from the results in Table 1 that the hardened mortar prepared by using the hydraulic composition of the present invention has a compressive strength of 700 kgf/cm$^2$ or higher at one day age and 1120 kgf/cm$^2$ or higher at 28 day age, whereas the comparative specimens have a low compressive strength in every case.

EXAMPLES 10 TO 12 AND COMPARATIVE EXAMPLE 9

The cement composition prepared in Example 6, the same high-early-strength Portland cement as used in the foregoing Examples, fine aggregate (crushed sand of Ohme, Japan), coarse aggregate (crushed stone of Ohme, Japan), and a water reducing agent ("Mighty 150" produced by Kao Corp.; an aqueous solution of a β-naphthalene sulfonate-formalin condensation product; solids content: 42%; specific gravity: 1.20) were used as concrete raw materials. The mixing ratio of these raw materials are shown in Table 2 below.

The cement composition and the fine aggregate were dry mixed in a mixer, and mixing water having dissolved therein the aqueous solution of the water reducing agent was poured therein, followed by kneading. The coarse aggregate was then added, and the kneading was continued to prepare a concrete mixture.

The concrete mixture was molded into a cylinder having a diameter of 10 cm and a height of 20 cm according to JIS A1132 "Method of Making and Curing Concrete Specimens" and cured in the same manner as in the foregoing Examples. The compressive strength at 1 or 28 day age was measured. The results obtained are shown in Table 2.

TABLE 2

| Example No. | Water/Hydraulic Composition (Water/Cement Composition) (%) | s/a** (%) | Unit Weight (kg/m$^3$) Cement Composition | Unit Weight (kg/m$^3$) Mixing Water | Unit Weight (kg/m$^3$) Fine Aggregate | Unit Weight (kg/m$^3$) Coarse Aggregate | Water Reducing Agent (%*) | Properties of Concrete Mixture Slump (cm) | Properties of Concrete Mixture Air Content (%) | Compressive Strength (kgf/cm$^2$) 1 Day | Compressive Strength (kgf/cm$^2$) 28 Days |
| --- | --- | --- | --- | --- | --- | --- | --- | --- | --- | --- | --- |
| Example 10 | 21.0 (21.0) | 40.0 | 700 | 147 | 626 | 961 | 2 (0.84) | 17.5 | 1.5 | 921 | 1,004 |
| Example 11 | 24.7 (24.7) | 40.7 | 700 | 173 | 613 | 914 | 2 (0.84) | 17.9 | 1.9 | 814 | 983 |
| Example 12 | 25.6 (25.6) | 40.9 | 500 | 128 | 728 | 1,077 | 2 (0.84) | 18.1 | 1.7 | 784 | 985 |
| Comparative Example 9 | 33.9 (34.0) | 42.6 | 500 | 170 | 715 | 986 | 2 (0.84) | 18.2 | 1.7 | 372 | 821 |

Note:
*Compounding ratios of the aqueous solution. Values in the parentheses are compounding ratios on a solid basis.
**Sand-coarse aggregate ratio It is understood from the results in Table 2 that it was confirmed that a high compressive strength can be manifested similarly to the foregoing Examples even where a cement composition and a water reducing agent are successively kneaded with the other concrete raw materials to ultimately prepare a concrete mixture containing the hydraulic composition according to the present invention.

EXAMPLES 13 TO 15 AND COMPARATIVE EXAMPLES 10 TO 11

Concrete piles were produced and evaluated in the following manners.

(1) Materials, Compounding and Kneading

A concrete mixture was prepared using the same concrete raw materials by the same kneading method as used in Examples 10 to 12 and Comparative Example 9, except for further using siliceous powder (a product of Chichibu Mining Co., Ltd.; specific surface area: 3,950 cm$^2$/g) as a raw material. The compounding ratio of these raw materials are shown in Table 3 below.

(2) Preparation of Specimen and Curing

The concrete mixture was molded by centrifugal compaction to prepare hollow cylinders each having a diameter of 20 cm, a height of 30 cm, and a wall thickness of 4 cm according to JIS A 1136 "Method of Test for Compressive Strength of Span Concrete". The centrifugal compaction was conducted under a condition of 5 G for the first 2 minutes, 15 G for the intermediate 1 minute, and 30 G for the last 5 minutes, making one cycle.

Immediately after the molding, the moldings were subjected to moist curing for 24 hours and removed from the mold. One of the specimens was immediately subjected to measurement of compressive strength at one day age, while another specimen was cured in water at 20° C. to an age of 3 days.

(3) Measurement of Compressive Strength

Measurements of the compressive strength were in according to JIS A1108 "Method of Test for Compressive Strength of Concrete". The results obtained are shown in Table 3.

As a result, the concrete piles produced using the hydraulic composition at the specific water/hydraulic composition ratio according to the present invention exhibit a compressive strength as high as 800 kgf/cm$^2$ or more at one day age.

(4) Creep and Ratio of Sludge Yield

The concrete mixture prepared in Example 14 was subjected to creep testing in accordance with ASTM C512 "Standard Test Method for Creep of Concrete in Compression". The result obtained is also shown in Table 3.

In general, centrifugal molding for the production of concrete piles is accompanied with by-production of sludge. The ratio of sludge yield, i.e., the weight percentage of the sludge based on the weight of the concrete mixture charged in the mold, was measured. The results obtained are shown in Table 3.

COMPARATIVE EXAMPLE 12

Concrete pile specimens for compressive strength measurement were prepared in accordance with a conventional process. That is, a concrete mixture was prepared using the above-described high-early-strength Portland cement according to the compounding ratio shown in Table 3 and molded in the same manner as in Example 12.

The moldings were allowed to stand at 20° C. for 2 hours, followed by steam curing at 60° C. for 4 hours, again allowed to stand at 20° C. for 3 hours, followed by autoclave curing at 180° C. and at 10 kgf/cm$^2$ for 5 hours, allowed to cool, and then subjected to water curing at 20° C. to a prescribed age.

The compressive strength of each specimen was measured in the same manner as described in Examples 13 to 15. The creep and ratio of sludge yield were also measured in the same manner as in Example 13 to 15. The results obtained are shown in Table 3.

TABLE 3

| Example No. | Water/Hydraulic Composition (Water/Cement Composition) (%) | sa** (%) | Cement Composition | Siliceous Powder | Mixing Water | Fine Aggregate | Coarse Aggregate | Water Reducing Agent (%*) |
|---|---|---|---|---|---|---|---|---|
| Comparative Example 10 | 16.0 (16.0) | 42.8 | 480 | 0 | 77 | 826 | 1,129 | 2 (0.84) |
| Example 13 | 18.9 (19.0) | 43.4 | 480 | 0 | 91 | 821 | 1,098 | 2 (0.84) |
| Example 14 | 22.0 (22.1) | 44.0 | 480 | 0 | 106 | 818 | 1,062 | 2 (0.84) |
| Example 15 | 25.0 (25.0) | 44.6 | 480 | 0 | 120 | 811 | 1,031 | 2 (0.84) |
| Comparative Example 11 | 27.9 (27.9) | 45.2 | 480 | 0 | 134 | 805 | 999 | 2 (0.84) |
| Comparative Example 12 | 30.6 (30.6) | 45.6 | 480 | 80 | 147 | 792 | 967 | 2 (0.84) |

| Example No. | Slump (cm) | Air Content (%) | 1 Day | 3 Days | Unit Creep (×10$^{-6}$ kgf/cm$^2$) | Ratio of Sludge Yield (%) |
|---|---|---|---|---|---|---|
| Comparative Example 10 | — | — | (Mixing was difficult.) | | | |
| Example 13 | 3.4 | 1.9 | 994 | 1,190 | — | 0 |
| Example 14 | 2.4 | 2.0 | 891 | 1,068 | 1.25 | 0 |
| Example 15 | 3.2 | 2.1 | 810 | 987 | — | 0 |
| Comparative Example 11 | 3.5 | 2.0 | 729 | 939 | — | 0.2 |
| Comparative Example 12 | 3.2 | 1.8 | 539 | 850 | 1.28 | 1.0 |

Note:
*Compounding ratios of the aqueous solution. Values in the parentheses are compounding ratios on a solid basis.
**Sand-coarse aggregate ratio It is seen from Table 3 that no sludge was by-produced where a water/hydraulic composition ratio was 25% or less.

As described and demonstrated above, the present invention provides a hydraulic composition comprising (a) a size-adjusted cement composition having been treated by water spraying so as to have a controlled loss on ignition and (b) a water reducing agent. A mortar or concrete mixture prepared by using such a hydraulic composition exhibits sufficient fluidity, and hardened mortar or concrete obtained therefrom has a far higher compressive strength than that obtained by conventional processes.

The hydraulic composition of the present invention can be prepared by starting with known cement or known water reducing agents and utilizing commonly employed facilities and means, and is thus characterized by ease of practical application. In addition, high strength concrete piles can be produced by centrifugal compaction of a concrete mixture prepared from the above-mentioned hydraulic composition at a specific water/hydraulic composition ratio, followed by moist curing for only 1 day.

While the conventional processes essentially involve steam or autoclave curing, the process of the present invention requires no facilities for such heating curing, thus making a great contribution in industry in terms of energy and space saving. In addition, the process is accompanied with substantially no sludge by-production, which is a secondary favorable effect from the standpoint of environmental hygiene.

While the invention has been described in detail and with reference to specific examples thereof, it will be apparent to one skilled in the art that various changes and modifications can be made therein without departing from the spirit and scope thereof.

What is claimed is:

1. A hydraulic composition comprising (a) a cement composition prepared by subjecting size-adjusted cement having its particle size distribution adjusted to have a 50% pass particle diameter of from 2 to 7 μm and a 90% pass particle diameter to 10% pass particle diameter ratio of from 25 to 40 to a water-spraying treatment to increase the loss on ignition thereof by 0.5 to 2.0% by weight and (b) a water reducing agent.

2. A hydraulic composition as claimed in claim 1, wherein said size-adjusted cement has its particle size distribution adjusted to have a 50% pass particle diameter of from 2 to 5 μm.

3. A hydraulic composition as claimed in claim 1, wherein said size-adjusted cement has its particle size distribution adjusted to have a 90% pass particle diameter to 10% pass particle diameter ratio of from 30 to 40.

4. A hydraulic composition as claimed in claim 1, wherein said size-adjusted cement is prepared by size adjustment of Portland cement.

5. A hydraulic composition as claimed in claim 1, wherein said size-adjusted cement is prepared by size adjustment of high-early-strength Portland cement.

6. A hydraulic composition as claimed in claim 1, wherein said cement composition is a cement composition having been subjected to a water-spraying treatment to increase its loss on ignition by 0.8 to 1.8% by weight.

7. A hydraulic composition as claimed in claim 1, wherein said water reducing agent is a β-naphthalene sulfonate-formalin condensation product.

8. A hydraulic composition as claimed in claim 1, wherein said hydraulic composition provides hardened mortar having a compressive strength of 700 kgf/cm$^2$ or higher at one day age.

9. A process for producing a high strength concrete pile comprising centrifugal molding and curing of a concrete raw material mixture, said concrete raw material mixture comprising (A) a hydraulic composition, as a cement, comprising (a) a cement composition prepared by subjecting size-adjusted cement having its particle size distribution adjusted to have a 50% pass particle diameter of from 2 to 7 μm and a 90% pass particle diameter to 10% pass particle diameter ratio of from 25 to 40 to a water-spraying treatment to increase its loss on ignition by 0.5 to 2.0% by weight and (b) a water reducing agent, and (B) from 18 to 25% by weight of water based on said hydraulic composition.

10. A process as claimed in claim 9, wherein the resulting concrete pile has a compressive strength of 800 kgf/cm$^2$ or higher at one day age.

* * * * *